US011197260B2

(12) United States Patent
Balla et al.

(10) Patent No.: US 11,197,260 B2
(45) Date of Patent: Dec. 7, 2021

(54) METHOD AND DEVICES OF NOTIFYING A FIRST USER EQUIPMENT, UE, OF A SUBSCRIBER IN A TELECOMMUNICATION NETWORK ON A DIALOG STATUS OF A SECOND UE OF SAID SAME SUBSCRIBER

(71) Applicant: Telefonaktiebolaget LM Ericsson (publ), Stockholm (SE)

(72) Inventors: László Balla, Pomáz (HU); Andreas Anulf, Lidingö (SE); Sándor Katona, Budapest (HU); Michael Lindström, Tullinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/642,608

(22) PCT Filed: Sep. 1, 2017

(86) PCT No.: PCT/EP2017/071971
§ 371 (c)(1),
(2) Date: Feb. 27, 2020

(87) PCT Pub. No.: WO2019/042563
PCT Pub. Date: Mar. 7, 2019

(65) Prior Publication Data
US 2020/0196267 A1 Jun. 18, 2020

(51) Int. Cl.
*H04W 60/04* (2009.01)
*H04W 8/24* (2009.01)
*H04W 68/00* (2009.01)
*H04W 80/12* (2009.01)

(52) U.S. Cl.
CPC ............. *H04W 60/04* (2013.01); *H04W 8/24* (2013.01); *H04W 68/005* (2013.01); *H04W 80/12* (2013.01)

(58) Field of Classification Search
CPC ..... H04W 60/04; H04W 8/24; H04W 68/005; H04W 80/12
(Continued)

(56) References Cited

U.S. PATENT DOCUMENTS 8,028,074 B2 * 9/2011 Allen ................. H04L 65/1066
709/227
2007/0011342 A1 * 1/2007 Rosenberg .......... H04L 65/1006
709/230
(Continued)

FOREIGN PATENT DOCUMENTS

| WO | 2009097032 A1 | 8/2009 | |
|---|---|---|---|
| WO | WO 2009/097032 A1 * | 8/2009 | ............ H04W 80/04 |
| WO | 2010030285 A1 | 3/2010 | |

OTHER PUBLICATIONS

IETF RFC 4235, Rosenberg et al. Nov. 2005.*
Roach, A. B., "Session Initiation Protocol (SIP)—Specific Event Notification", dynamicsoft, Jun. 2002, pp. 1-33.
(Continued)

*Primary Examiner* — William Nealon
(74) *Attorney, Agent, or Firm* — Murphy, Bilak & Homiller, PLLC

(57) ABSTRACT

A method of notifying a first User Equipment, UE, of a subscriber in a telecommunication network on a dialog status of a second UE of said same subscriber, said method comprising the steps of receiving, by an Application Server, AS, in said telecommunication network a register message for indicating to said AS that said first UE has registered in said telecommunication network, wherein said register message comprises an indication that said first UE is capable to receive Dialog Event notifications regarding dialog status events of UEs associated with said same subscriber, retrieving, by said AS, and triggered by said receiving of said register message, said dialog status of said second UE of
(Continued)

said same subscriber, and sending, by said AS, to said first UE, a notify message for notifying said first UE on said retrieved dialog status of said second UE.

13 Claims, 8 Drawing Sheets

(58) Field of Classification Search
USPC .......................................................... 370/329
See application file for complete search history.

(56) References Cited

U.S. PATENT DOCUMENTS

| 2009/0257433 | A1* | 10/2009 | Mutikainen | H04L 65/1083 |
| | | | | 370/392 |
| 2016/0156783 | A1* | 6/2016 | Mufti | H04L 65/1073 |
| | | | | 455/445 |
| 2016/0316414 | A1* | 10/2016 | Yeoum | H04M 3/58 |

OTHER PUBLICATIONS

Rosenberg, J., et al., "An INVITE-Initiated Dialog Event Package for the Session Initiation Protocol (SIP)", Nov. 2005, pp. 1-34.
Rosenberg, J., "Indicating User Agent Capabilities in the Session Initiation Protocol (SIP)", Aug. 2004, pp. 1-32.
Rosenberg, J., et al., "SIP: Session Initiation Protocol", Jun. 2002, pp. 1-232.
Unknown, Author, "3rd Generation Partnership Project; Technical Specification Group Core Network and Terminals; IP multimedia call control protocol based on Session Initiation Protocol (SIP) and Session Description Protocol (SDP); Stage 3 (Release 14)", 3GPP TS 24.229 V14.4.0, Jun. 2017, pp. 1-62.
Unknown, Author, "3rd Generation Partnership Project; Technical Specification Group Services and System Aspects; IP Multimedia Subsystem (IMS); Stage 2 (Release 14)", 3GPP TS 23.228 V14.4.0, Jun. 2017, pp. 1-164.

* cited by examiner

METHOD AND DEVICES OF NOTIFYING A FIRST USER EQUIPMENT, UE, OF A SUBSCRIBER IN A TELECOMMUNICATION NETWORK ON A DIALOG STATUS OF A SECOND UE OF SAID SAME SUBSCRIBER

TECHNICAL FIELD

The disclosure generally relates to the field of telecommunication networks and more particularly to Internet Protocol, IP, Multimedia Networks. The disclosure particularly relates to a method of notifying a first User Equipment, UE, of a subscriber in a telecommunication network on a dialog status of a second UE of said same subscriber.

BACKGROUND

As described in the 3G Partnership Project, 3GPP, standard 23.228, public user identities may be shared across multiple Private User identities within the same IP Multimedia Subsystem, IMS, subscription. Hence, a particular Public User Identity may be simultaneously registered from multiple User Equipment, UEs, that use different Private User Identities and different contact addresses. If a Public User Identity is shared among the Private User Identities of a subscription, then it is assumed that all Private User Identities in the Internet Protocol, IP, Multimedia Subsystem, IMS subscription share the Public User Identity.

The RFC 4235 is an INVITE initiated dialog event package for the Session Initiation Protocol, SIP. The RFC 4235 defines a dialog event package for the SIP event architecture, along with a data format used in notifications for this package. The dialog package allows users to subscribe to another user and receive notification of the changes in state of INVITE initiated dialog usages in which the subscribed-to user is involved.

As defined in RFC 3265, the SUBSCRIBE is a dialog creating method, i.e. it is not a simple request-response pair. The SUBSCRIBE creates an SIP dialog status machine both at the client side and the server side. The first NOTIFY sent upon receiving the SUBSCRIBE contains a full status information. These subscriptions are to be refreshed periodically. The NOTIFY message includes the same information as the previously sent NOTIFY message.

When more than one User Equipment, UE, is connected to the same IMS subscription, the UE application may require information about the sessions involving the other UEs belonging to the same IMS subscription. Such information is needed, for example, for moving sessions between UEs, joining to ongoing sessions etc.

The dialog status machine means that processing resources such as processes, timer and memory are reserved both in the client and the server side. These resources are reserved even if no other traffic is running to/from the client, so creating idle load. At the server side, resources may be reserved for each subscribing device.

As the devices of the same subscriber may not be aware of each other, the resources are reserved for the subscription even when the user has only one active, registered, device. This means unnecessary idle load and idle signalling, which can be significant if a high number of devices are using this function.

The reserved resources in the network side also make it hard to optimize/re-distribute network side resources according to network load. Idle subscribers, that are not involved in traffic session, can be reassigned to other Application Servers, AS. The reserved network side resources in the AS prevents such reallocation or needs additional signalling.

Furthermore, If an AS fails, the subscription identity is silently lost, and not renewed until the subscription is refreshed by the UE. This can mean even hours without dialog status notifications. If the AS is reallocated, as can occur frequently in a cloud based environment, the subscriptions can be moved to the new AS, but this will generate network signalling down to all the affected UEs.

Therefore, there is a requirement to achieve a solution that presents a reduced idle load, and at the same time also addresses the issue of migrating and/or failed Application Servers.

SUMMARY

It is an object to provide for a method of notifying a first User Equipment, UE, of a subscriber, on a dialog status, i.e. dialog state, of a second UE of the same subscriber.

It is another object to provide for devices arranged for operation in a telecommunication network and which are arranged for supporting the notifying of a first User Equipment of a subscriber, on a dialog status of a second UE of the same subscriber.

In a first aspect of the disclosure, there is provided a method of notifying a first User Equipment, UE, of a subscriber in a telecommunication network on a dialog status of a second UE of said same subscriber.

The method comprises the step of receiving by an Application Server, AS, in said telecommunication network a register message for indicating to said AS that said first UE has registered in said telecommunication network, wherein said register message comprises an indication that said first UE is capable to receive Dialog Event notifications regarding dialog status events of UEs associated with said same subscriber. The method further comprises the step of retrieving, by said AS, and triggered by said receiving of said register message, said dialog status of said second UE of said same subscriber. Finally, the method comprises the step of sending, by said AS, to said first UE, a notify message for notifying said first UE on said retrieved dialog status of said second UE.

In a first step, the AS receives a register message indicating that a UE has registered in the telecommunication network. It was the insight of the inventors that it may be advantageous to include additional information regarding the UEs capability within this message. More specifically, it may be desired to include information indicating the UEs capability to receive dialog status notifications regarding dialog status events of other UEs associated with the same subscriber.

In a next step, the AS may retrieve the dialog status of the second UE of the same subscriber. That is, the AS may check whether the subscriber of the first UE has an other UE coupled to that same subscription. It may, for example, look for such information in a look up table or the like. As a result, the AS may determine that said second UE has been associated with the same subscription. Even more UEs may be associated with the same subscription.

Finally, the AS sends, to the first UE, a notify message for notifying the first UE on said retrieved dialog status of the second UE. The AS may also notify the first UE on retrieved dialog states of other UEs in case that the subscription covers even more UEs.

One of the advantages of the presented method is that it eliminates the need for subscription related finite state machines creation in at least one of the client and the server. That is, the method is directed to standalone/unsolicited messages that are sent to the first UE about dialog status of a second UE.

In accordance with the present disclosure, a standalone message means that the message is sent without the creation of finite state machines at at least one of the server side and the client side.

Another advantage of the presented method is that it reduces the network load as it does not require any idle signalling. Further, it is a resilient solution which is non-sensitive to AS server failure.

In accordance with the present disclosure, the presented method is especially suitable for the Session Initiation Protocol, SIP. SIP is a signalling protocol standard accepted by the 3G Partnership Project, 3GPP. It is considered a permanent element of the Internet Protocol, IP, Multimedia Subsystem, IMS, architecture for IP based multimedia services in cellular networks.

In accordance with the present disclosure, dialog state events may be any of a freshly established connection to the network, a lost connection to the network, a dropped connection to the network, or anything a like.

In an example according to the present disclosure, the method further comprises the steps of detecting, by said AS, a dialog status change of said second UE of said subscribe and sending, by said AS, to said first UE, a notify message for notifying said first UE on said changed dialog status of said second UE.

The advantage of this example is that the first UE is not only notified on the dialog status of the second UE upon registration thereof in the telecommunication, but that the first UE is also notified on changes in the dialog status of the second UE at any particular moment in time.

In an example according to the present disclosure, said indication that said first UE is capable to receive Dialog Event notifications comprises any of an empty value indicating that said first UE is interested in all changes in said dialog status of UE's associated with said same subscriber, an "initial" value indicating that said first UE is interested in initial dialog status of UE's associated with said same subscriber, a "Confirmed" value indicating that said first UE is interested in newly established dialog states of UE's associated with said same subscriber or a "Terminated" value indicating that said first UE is interested in terminated dialog states of UE's associated with said same subscriber.

According to an example of the present disclosure, the method comprises the further step of refraining, by said AS, from starting a Finite State Machine associated with said first User Equipment, UE, based on said received register message.

It was found that, typically, the AS initiates a Finite State Machine associated with the first UE based on the received register message. Starting, i.e. initiating, a Finite State Machine is, in accordance with the present disclosure, no longer required as the first UE is able to receive unsolicited, i.e. standalone, notifications concerning the dialog status of any second UE within the same subscription.

In a second aspect of the disclosure, there is presented a method of registering a first User Equipment, UE, of a subscriber in a telecommunication network such that said network is able to notify said first UE on a dialog status of a second UE of said same subscriber.

The method comprises the step of receiving, by a node in said telecommunication network, a registration request message for requesting registration of said first UE in said telecommunication network, wherein said registration request message comprises an indication that said first UE is capable to receive standalone Dialog Event notifications regarding dialog status events of UEs associated with said same subscriber. The method further comprises the step of storing, by said node, said indication that said first UE is capable to receive standalone Dialog Event notifications regarding dialog status events of UEs associated with said same subscriber. The method further comprises the step of sending, by said node, a register message for indicating to said AS that said first UE has registered in said telecommunication network, wherein said register message comprises an indication that said first UE is capable to receive standalone Dialog Event notifications regarding dialog status events of UEs associated with said same subscriber.

In a third aspect of the present disclosure, there is presented a method of requesting registration in a telecommunication network, by a first user equipment, UE, of a subscriber in said telecommunication network.

The method comprises the step of sending, by said first UE, a registration request message for requesting registration of said first UE in said telecommunication network, wherein said registration request message comprises an indication that said first UE is capable to receive standalone Dialog Event notifications regarding dialog status events of UE's associated with said same subscriber, and receiving, by said first UE, from an Application Server in said telecommunication network, a notify message for notifying said first UE on said retrieved dialog status of said second UE.

In a fourth aspect of the present disclosure, there is disclosed an application server arranged to operate in a telecommunication network and arranged for notifying a first User Equipment, UE, of a subscriber in said telecommunication network on a dialog status of a second UE of said same subscriber.

The application server comprises receive equipment arranged for receiving a register message for indicating to said AS that said first UE has registered in said telecommunication network, wherein said register message comprises an indication that said first UE is capable to receive standalone Dialog Event notifications regarding dialog status events of UE's associated with said same subscriber, retrieve equipment arranged for retrieving, and triggered by said receiving of said register message, said dialog status of said second UE of said same subscriber and transmit equipment arranged for sending, to said first UE, a notify message for notifying said first UE on said retrieved dialog status of said second UE.

According to an exemplary embodiment of the Application server according to the present disclosure, the application server further comprises detect equipment arranged for detecting a dialog status change of said second UE of said subscriber, wherein said transmit equipment is further arranged for sending to said first UE, a notify message for notifying said first UE on said changed dialog status of said second UE.

According to an example of the present disclosure, the indication that said first UE is capable to receive standalone Dialog Event notifications comprises any of an empty value indicating that said first UE is interested in all changes in said dialog status of UE's associated with said same subscriber, an "initial" value indicating that said first UE is interested in initial dialog states of UE's associated with said same subscriber, a "Confirmed" value indicating that said first UE is interested in newly established dialog states of UE's associated with said same subscriber, or a "Terminated" value indicating that said first UE is interested in terminated dialog states of UE's associated with said same subscriber.

An example according to the present disclosure further comprises refrain equipment arranged for refraining from starting a Finite State Machine associated with said first User Equipment, UE, based on said received register message.

In a fifth aspect of the present disclosure, there is presented a node for supporting registration of a first User Equipment, UE, of a subscriber in a telecommunication network such that said network is able to notify said first UE on a dialog status of a second UE of said same subscriber.

The node comprises receive equipment arranged for receiving a registration request message for requesting registration of said first UE in said telecommunication network, wherein said registration request message comprises an indication that said first UE is capable to receive standalone Dialog Event notifications regarding dialog status events of UE's associated with said same subscriber, store equipment arranged for storing said indication that said first UE is capable to receive standalone Dialog Event notifications regarding dialog status events of UE's associated with said same subscriber and transmit equipment arranged for transmitting a register message for indicating to said AS that said first UE has registered in said telecommunication network, wherein said register message comprises an indication that said first UE is capable to receive standalone Dialog Event notifications regarding dialog status events of UE's associated with said same subscriber.

In a sixth aspect of the disclosure, there is provide a User Equipment, UE, arranged for requesting registration in a telecommunication network, by a first user equipment, UE, of a subscriber in said telecommunication network, wherein said UE comprises transmit equipment arranged for sending a registration request message for requesting registration of said first UE in said telecommunication network, wherein said registration request message comprises an indication that said first UE is capable to receive standalone Dialog Event notifications regarding dialog status events of UE's associated with said same subscriber and receive equipment arranged for receiving, from an Application Server in said telecommunication network, a notify message for notifying said first UE on said retrieved dialog status of said second UE.

In a seventh aspect of the disclosure, there is provided a computer program product, comprising a readable storage medium, comprising instructions which, when executed on at least one processor, cause the at least one processor to carry out the methods as provided above.

In an eighth aspect of the present disclosure, there is provided an application server for operating in a telecommunication network and arranged for notifying a first User Equipment, UE, of a subscriber in said telecommunication network on a dialog status of a second UE of said same subscriber, said application server comprising receive module for receiving a register message for indicating to said AS that said first UE has registered in said telecommunication network, wherein said register message comprises an indication that said first UE is capable to receive standalone Dialog Event notifications regarding dialog status events of UE's associated with said same subscriber, a retrieve module for retrieving, and triggered by said receiving of said register message, said dialog status of said second UE of said same subscriber, and transmit module for sending, to said first UE, a notify message for notifying said first UE on said retrieved dialog status of said second UE.

In a ninth aspect of the disclosure, there is disclosed a node for supporting registration of a first User Equipment, UE, of a subscriber in a telecommunication network such that said network is able to notify said first UE on a dialog status of a second UE of said same subscriber, said node comprising receive module for receiving a registration request message for requesting registration of said first UE in said telecommunication network, wherein said registration request message comprises an indication that said first UE is capable to receive standalone Dialog Event notifications regarding dialog status events of UE's associated with said same subscriber, a store module for storing said indication that said first UE is capable to receive standalone Dialog Event notifications regarding dialog status events of UE's associated with said same subscriber and transmit module for transmitting a register message for indicating to said AS that said first UE has registered in said telecommunication network, wherein said register message comprises an indication that said first UE is capable to receive standalone Dialog Event notifications regarding dialog status events of UE's associated with said same subscriber.

In a tenth aspect of the present disclosure, there is presented a User Equipment, UE, for requesting registration in a telecommunication network, by a first user equipment, UE, of a subscriber in said telecommunication network, wherein said UE comprises a transmit module for sending a registration request message for requesting registration of said first UE in said telecommunication network, wherein said registration request message comprises an indication that said first UE is capable to receive standalone Dialog Event notifications regarding dialog status events of UE's associated with said same subscriber and receive module for receiving, from an Application Server in said telecommunication network, a notify message for notifying said first UE on said retrieved dialog status of said second UE.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
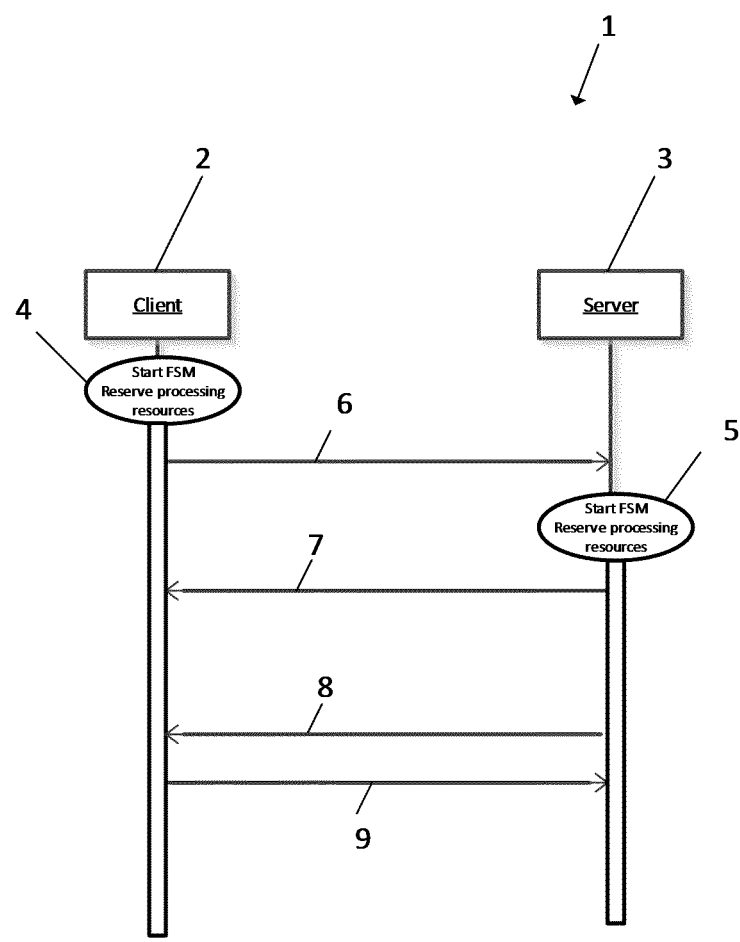
FIG. 1 is a schematic chart illustrating an example of a signalling diagram in accordance with the prior art.

FIG. 1 is a schematic chart illustrating an example of a signalling diagram 1. Such a signalling diagram 1 is known as part of the prior art and presents a problem of idle load. Avoiding a situation of idle load is an objective of the present disclosure.

In a Session Initiation Protocol, SIP, based communication network, a User Equipment, UE, i.e. client 2, in a telecommunication network sends a SUBSCRIBE request to a server 3. Such a client 2 may be a User Equipment, UE, in the telecommunication network or any other User Agent, UA. A UA is a logical network end-point used to create or receive SIP messages. The server 3 may be any server arranged for receiving a SIP request and providing a corresponding SIP response. In this particular example, server 3 may be considered to be an Application Server, AS.

Since a SUBSCRIBE request 6 is a dialog creating method, it creates an SIP dialog status machine both at the client side 4 and at the server side 5. The dialog status machine means 4, 5 that it reserves processing resources such as processors, timers and/or memory both at the client side 2 and the server side 3. A SUBSCRIBE request 6 as known in the prior art comprises of information such as call-id, originating tag, destination tag etc. The server 3, after reserving process resources 5 at the server side, sends a response 7 to the client 2. Such a response 7 may be, for example, a 200 OK response.

The resources as indicated with reference numerals 4, 5 are reserved even if no other traffic is running in between the client 2 and the server 3, thereby creating an idle load. This can lead to further signalling 8, 9 between the client and the server in order to refresh and renew the connection, even when no processes are active.

One of the advantages of the present disclosure is that it combats the above described situation. That is, the solution according to the present disclosure ensures that the idle load is reduced.

Figure 2:
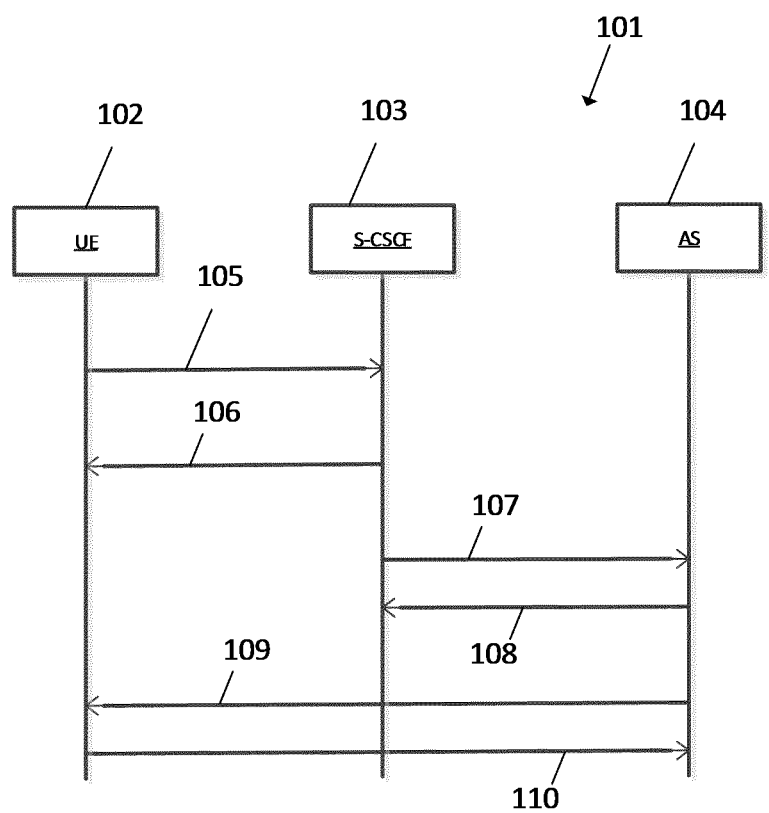
FIG. 2 is a schematic chart illustrating an example of a signalling diagram.

FIG. 2 is a schematic chart illustrating an example of a signalling diagram 101 according to the present disclosure. In an example, whenever a UE 102 is registered in a telecommunication network, it is proposed to introduce a new user agent capability tag. The UE 102, when registering in the IP Multimedia Sub-system, IMS, network may include the capability tag in a REGISTER message 105. The tag may be, for example, included in the contact header of the REGISTER message 105. According to an embodiment of the disclosure, the capability tag may be in the form:

+self-dialog-info-events, or
+self-dialog-info-events="Initial/Confirmed/Terminated".

In a first example, an empty value may indicate that the UE 102 is interested in all dialog status changes, for example the ones defined in the RFC 4235 standard. On the other hand, if the UE 102 is not interested in all events, it can list the interesting events separated with a "/" character. Such a list may include an "initial" value indicating that said first UE 102 is interested in initial dialog states of UEs associated with said same subscriber, a "Confirmed" value indicating that said first UE 102 is interested in newly established dialog states of UEs 102 associated with said same subscriber or a "Terminated" value indicating that said first UE 102 is interested in terminated dialog states of UEs 102 associated with said same subscriber.

The capability tag may be stored by the Registrar, i.e. the Serving Call State Control Function, S-CSCF, 103 and the registration OK response 106 may be provided back to the UE 102. The capability tag may then be shared to the application Server 104, by the Registrar 103, during the 3$^{rd}$ party registration process 107, 108.

The AS 104 acting as a Dialog status notifier may store this tag together with any other available contact information. The AS 104, then sends 109, 110 the up to date dialog status of other devices of the same subscriber in a stand-alone notify message depending on the UE's 102 indicated preferences. This up to date state may not include the terminated dialogs.

Figure 3:
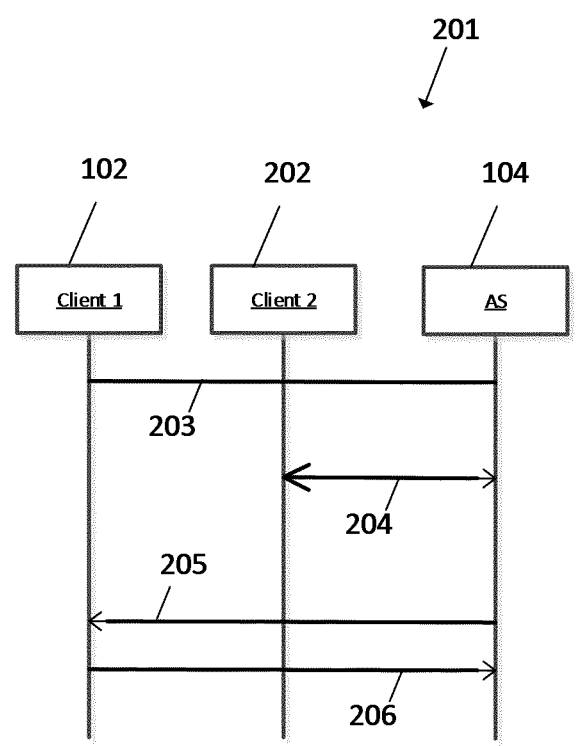
FIG. 3 is a schematic chart illustrating an example of a signalling diagram.

FIG. 3 is a schematic chart illustrating an example 201 of signalling diagram. According to the diagram shown in FIG. 3, a UE 102 is registered 203 in an IMS network indicating a capability tag to the AS 104. Such a registration may occur according to a sequence of steps as shown in FIG. 2. Whenever a dialog status change event 204 happens for a second UE 202 of the same subscriber, the AS 104 checks whether there is any other UE 102 of the same subscriber registered with, for example, the "+simple-self-dialog-info" capability flag. If such a UE 102 is found, the AS 104 sends the up to date dialog status of the other device(s) 202 of the subscriber in a stand-alone NOTIFY message 205 to this UE.

The up to date state may not include the terminated dialogs. So, if a dialog status changes to "Terminated" and UE 102 is interested in this state change, the NOTIFY will not include this dialog, but it merely notifies the UE of the change in dialog status.

Figure 4:
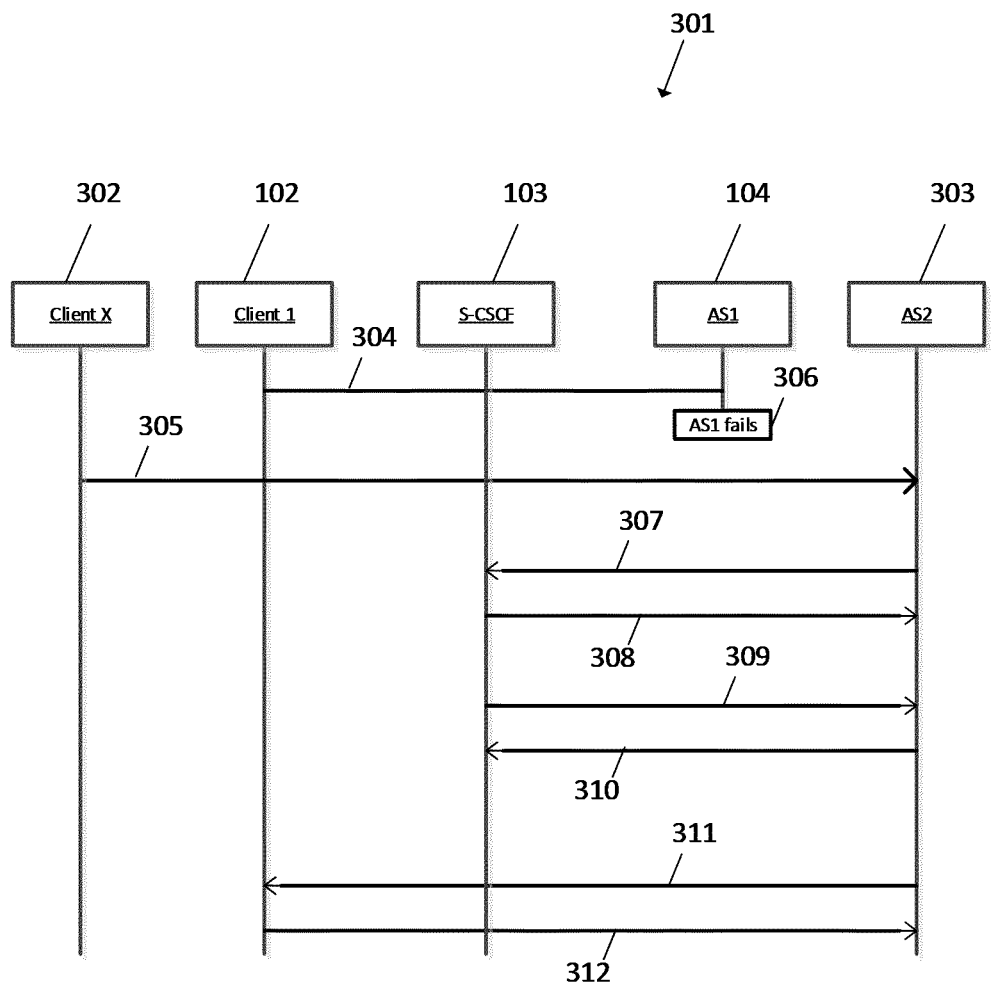
FIG. 4 is a schematic chart illustrating an example of a signalling diagram.

FIG. 4 is a schematic chart 301 illustrating an example of the signalling diagram when a first Application Server, AS1, 104 fails. According to this illustration, a first UE 102 is registered 304 in an IMS network and assigned a specific AS1 104. It is assumed that for some reason, AS1 fails 306. Alternately, in a cloud based environment, it is also possible that AS1 104 migrates to a new AS, AS2 303. A second UE 302 is registered 305 with the same subscriber in the IMS network. The new AS 303 will fetch 307-310 the stored capabilities of the UE 102 from the Registrar, S-CSCF, 103. This information may be fetched by using a SUBSCRIBE 307-308 and a NOTIFY 309-310, pair of messages between the Registrar, S-CSCF, and the new AS 303.

Thus the new AS 303 is aware of the first UE's 102 desire to receive standalone notifications without any additional network signalling. Thus when a dialog status of subsequent UE 302 changes, the UE 102 is notified 311-312 of this dialog status change. Furthermore, it is evident that this migration is successfully achieved without involving any additional network signalling. It may further be noted that the UEs 102, 302 are not aware of the failure of the AS 104 and the assignment of a new AS 303. Advantageously, no information is lost due to the AS failure.

Figure 5:
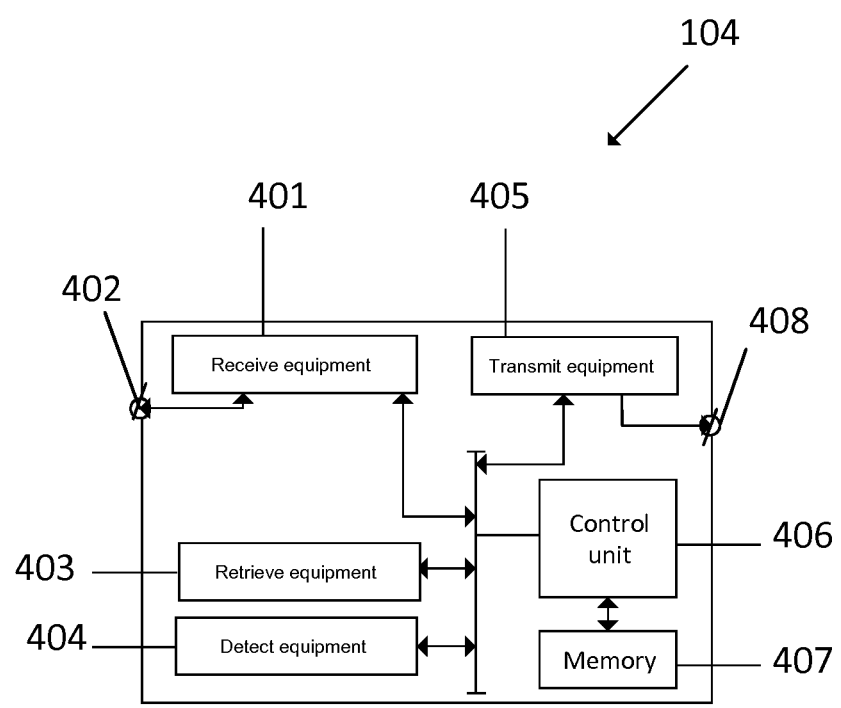
FIG. 5 is a schematic chart illustrating an example of a application server.

FIG. 5 is a schematic chart illustrating an example of an application server. Specifically, it indicates an Application Server 104 that is arranged for notifying a UE of a change in dialog status of a second UE, wherein both first and second UEs are registered in a telecommunication network of the same subscriber.

The example, 104, comprises receive equipment 401, 402, arranged for receiving information from at least one source which is external to said telecommunication network and for receiving signalling information from other nodes within the IMS network. The receive equipment 402 is further arranged to receiving a register message wherein the register message comprises capability information. The capability information, as discussed earlier, indicates a capability of a first UE to receive indication of dialog status changes of other UEs of the same subscriber in a telecommunication network.

Further, retrieve equipment 403 is provided, arranged for retrieving a dialog status of a second UE of the same subscriber in the telecommunication network. This retrieval may be triggered by receiving a register message by the receive equipment 401. There is also provided a Detect equipment 404 which is arranged for detecting a dialog status change of a second UE of a subscriber.

The example, 104, comprises a control unit, 406 and a memory, 407. Transmit equipment 405 and 408 are also provided within the example in order to facilitate communication with external devices such as User Equipment, UE, or other network elements. In particular, Transmit Equipment 405 is further arranged for sending a notify message to a first UE pertaining to changed dialog status of a subsequent UE registered with the same subscriber.

Figure 6:
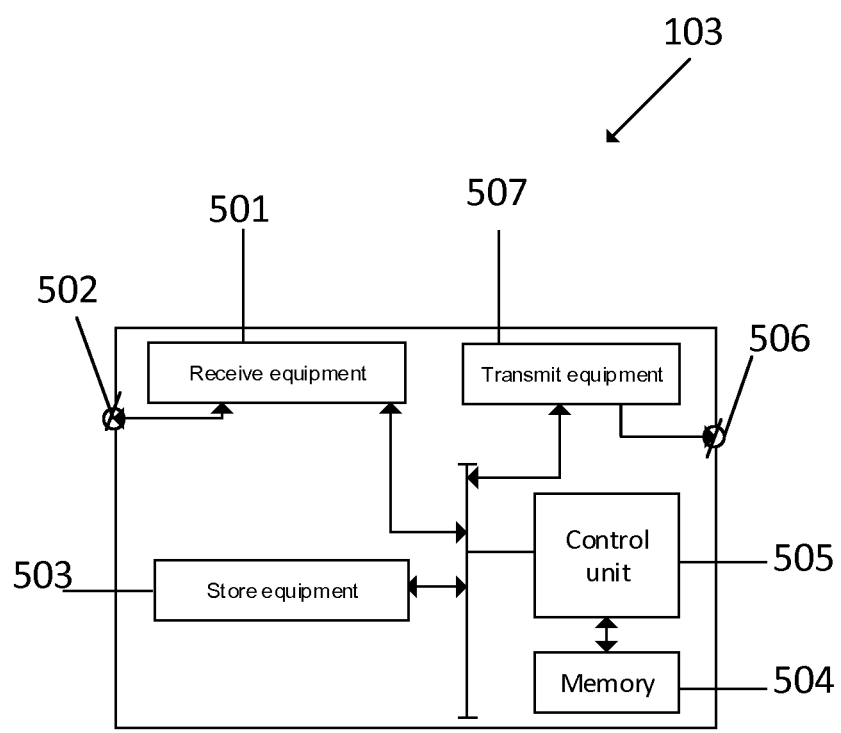
FIG. 6 is a schematic chart illustrating an example of a network node.

FIG. 6 is a schematic chart illustrating an example of a network node. Specifically, it indicates a node 103 in a telecommunication network arranged for supporting registration of a UE. Such a node could be, for example, a Serving Call Session Control Function, S-CSCF, 103. The S-CSCF is characterized in that it is arranged for notifying a UE of a change in dialog status of a second UE, wherein both first and second UEs are registered in a telecommunication network of the same subscriber.

The example, 103, comprises receive equipment 501, 502, arranged for receiving information from at least one source which is external to said telecommunication network and for receiving signalling information from other nodes within the IMS network. The receive equipment 501 is further arranged for receiving a registration request message from a UE for being registered in the telecommunication network. As discussed earlier, the registration request message further comprises an additional tag indicating the capability of the UE to receive standalone dialog event notifications. These dialog event notifications are notifications regarding the dialog status change of a second UE registered with the same subscriber as the first UE in the telecommunication network.

Further, store equipment 503 is provided, arranged for storing the indication regarding the capability of the first UE. The store equipment therefore avoids the need for signalling between AS and the UE in order to provide notifications regarding dialog status changes.

The example, 103, comprises a control unit, 505 and a memory, 504. Transmit equipment 506 and 507 are also provided within the example in order to facilitate communication with external devices such as User Equipment, UE, or other network elements. In particular, Transmit Equipment 507 is further arranged for sending the register message to the AS. The register message indicates that a first UE has been registered in the IMS network. Furthermore, as indicated earlier, the register message also comprises an indication regarding the capability of the UE to receive dialog status change notifications associated with a second UE registered with the same subscriber in the telecommunication network.

Figure 7:
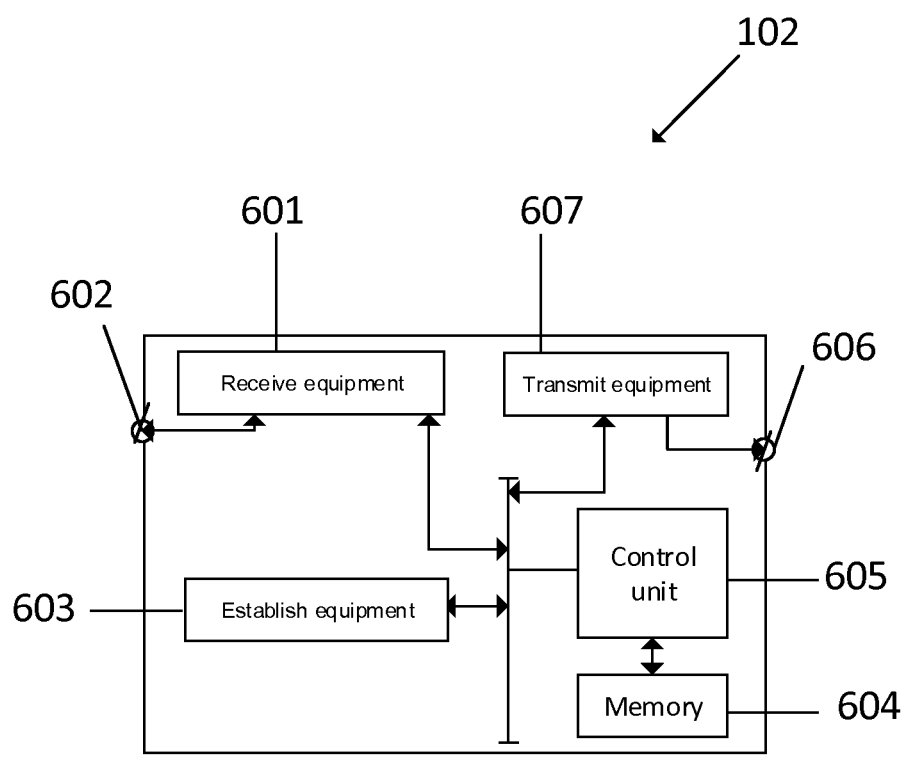
FIG. 7 is a schematic chart illustrating an example of a User Equipment, UE.

FIG. 7 is a schematic chart illustrating an example of a User Equipment. Specifically, it indicates a User Equipment, UE, 102 in a telecommunication network arranged for requesting registration in a telecommunication network. The UE is characterized in that it is arranged for including, in the registration request message, an indication regarding its capability to receive standalone messages pertaining to dialog status events of other UEs associated with the same subscriber.

The example, 103, comprises receive equipment 601, 602, arranged for receiving information from at least one source which is external to said telecommunication network and for receiving signalling information from other nodes within the IMS network. The receive equipment 601 is further arranged for receiving a notify message, from an AS. The notify message relates to a retrieved dialog status of a second UE in the telecommunication network.

Further, establish equipment 603 is provided, which may be arranged for establishing a connection to the telecommunication network.

The example, 102, comprises a control unit, 605 and a memory, 604. Transmit equipment 606 and 607 are also provided within the example 102 in order to facilitate communication with external devices such as an Application Server, AS, or other network elements. In particular, Transmit Equipment 607 is further arranged for sending the registration request message. Furthermore, as indicated earlier, the registration request message also comprises an indication regarding the capability of the UE to receive dialog status change notifications associated with a second UE registered with the same subscriber in the telecommunication network.

Figure 8:
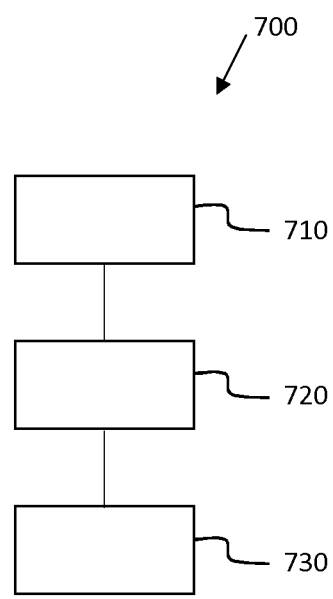
FIG. 8 is a schematic chart illustrating the basic steps involved in the method according to the present disclosure.

FIG. 8 is a schematic chart illustrating the basic steps involved in the method 700 according to the present disclosure. In a step of receiving 710, the AS receives a register message from a UE. The message indicates to the AS that a UE has registered in a telecommunication network. Additionally, the register message also comprises an indication of the UE's capability to receive standalone dialog event notifications regarding the dialog status events of a second UE associated with the same subscriber. The first UE may indicate its capability by indicating it in a header of the register request message as an additional flag. The UE may further indicate preferences as to what type of dialog status events it is interested in receiving. Such a preference could be, for example, "Initial/Confirmed/Terminated" to indicate that the UE is interested in initial dialog states of UEs associated with said same subscriber, or that said first UE is interested in newly established dialog states of UEs associated with said same subscriber or that said first UE is interested in terminated dialog states of UEs associated with said same subscriber, respectively.

In a step of retrieving 720, the AS retrieves a dialog status of a second UE. In a step of sending 730, the AS sends a notify message to the first UE. The notify message notifies the first UE of a dialog status change of the second UE.

It is noted that in the description of the present disclosure the terms "User Agent, UA" and "User Equipment, UE" have been used interchangeably. In a communication network based on SIP signalling, a UE is one example of a UA. A UA is capable sending request messages and receiving corresponding response messages. It is also noted that the terms "telecommunication network" "IMS network" have been used interchangeably to refer to a communication network arranged for transfer of voice and data over a wireless communication network.

One of the advantages of the present disclosure is that idle signalling network load is mitigated, or at least reduced, due to the event that no finite state machines are initiated at the server side and/or the client side.

Another advantage of the present disclosure is that the presented method is non-sensitive to Application Server failure, thereby improving the resilience of the signalling.

Yet a further advantage of the present disclosure is that the presented method may be optimized for cloud computing, without the need of application level state machines.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method performed by an Application Server (AS) in a telecommunication network, said method comprising:
   receiving a register message from a Call State Control Function (CSCF) in the telecommunication network, the register message sent by the CSCF responsive to a registration request message sent by a first User Equipment (UE) associated with a subscriber and requesting registration in the telecommunication network, the register message indicating that standalone notification messages should be sent towards the first UE for one or more types of Dialog Events involving other UEs that are registered in the telecommunication network and associated with the same subscriber; and
   sending a standalone notification message for the first UE, responsive to occurrence of a Dialog Event of the one or more types indicated in the register message and involving one of the other UEs.

2. The method in accordance with claim 1, further comprising detecting the occurrence of the Dialog Event.

3. The method in accordance with claim 1, wherein the register message includes header information that indicates the one or more types of Dialog Events for which standalone notification messages should be sent.

4. The method in accordance with claim 1, wherein said method further comprises refraining, by said AS, from starting a Finite State Machine associated with the first UE.

5. A method performed by a Call State Control Function (CSCF) in a telecommunication network, the method comprising:
   receiving a registration request message, requesting registration of a first User Equipment (UE) in the telecommunication network, wherein the first UE is associated with a subscriber and the registration request message indicates that standalone notification messages should be sent towards the first UE for one or more types of Dialog Events involving other UEs that are registered in the telecommunication network and associated with the same subscriber; and
   sending a register message towards an Application Server (AS) in the telecommunication network, where the register message indicates that the first UE has registered in said telecommunication network and that standalone messages should be sent towards the first UE for the one or more types of Dialog Events involving the other UEs.

6. A method of requesting registration in a telecommunication network, by a first user equipment (UE) of a subscriber in said telecommunication network, wherein said method comprises:
   sending, by said first UE, a registration request message, requesting registration of said first UE in said telecommunication network, wherein said registration request message indicates that standalone notification messages should be sent towards the first UE for one or more types of Dialog Events involving other UEs that are registered in the telecommunication network and associated with the same subscriber; and
   receiving, by said first UE, from an Application Server (AS) in said telecommunication network, one or more standalone notification messages indicating respective occurrences of Dialog Events of the one or more types and involving one or more of the other UEs.

7. An application server (AS) configured for operation in a telecommunication network and comprising:
   receive equipment arranged for receiving a register message from a Call State Control Function (CSCF) in the telecommunication network, the register message sent by the CSCF responsive to a registration request message sent by a first User Equipment (UE) associated with a subscriber and requesting registration in a telecommunication network, the register message indicating that standalone notification messages should be sent towards the first UE for one or more types of Dialog Events involving other UEs that are registered in the telecommunication network and associated with the same subscriber;
   and
   transmit equipment arranged for sending a standalone notification message for the first UE, responsive to occurrence of a Dialog Event of the one or more types indicated in the register message and involving one of the other UEs.

8. The application server in accordance with claim 7, wherein said application server further comprises
   detect equipment arranged for detecting the occurrence of the Dialog Event.

9. The AS in accordance with claim 7, wherein the register message includes header information that indicates the one or more types of Dialog Events for which standalone notification messages should be sent.

10. The AS in accordance with claim 7, wherein the AS is configured to refrain from starting a Finite State Machine associated with the first UE.

11. A Call State Control Function (CSCF) configured for operation in a telecommunication network, the CSCF comprising:
    receive equipment arranged for receiving a registration request message, requesting registration of a first User Equipment (UE) in the telecommunication network, the registration request message indicating that standalone notification messages should be sent towards the first UE for one or more types of Dialog Events involving other UEs that are registered in the telecommunication network and associated with the same subscriber;
    and
    transmit equipment arranged for transmitting a register message towards an Application Server (AS) in the telecommunication network, where the register message indicates that the first UE has registered in said telecommunication network and that standalone messages should be sent towards the first UE for one or more types of Dialog Events involving the other UEs.

12. A first User Equipment (UE) configured for operation in a telecommunication network, the first UE comprising:
    transmit equipment arranged for sending a registration request message, requesting registration of said first UE in said telecommunication network, the registration request message indicating that standalone notification messages should be sent towards the first UE for one or more types of Dialog Events involving other UEs that are registered in the telecommunication network and associated with the same subscriber; and receive equipment arranged for receiving, from an Application Server (AS) in said telecommunication network, one or more standalone notification messages indicating respective occurrences of Dialog Events of the one or more types and involving one or more of the other UEs.

13. The first UE, in accordance with claim 12, wherein said first UE further comprises establish equipment arranged for establishing an updated connection to said telecommunication network by sending a register message towards said AS.

* * * * *